United States Patent [19]

Chikagawa et al.

[11] Patent Number: 5,585,203
[45] Date of Patent: Dec. 17, 1996

[54] METHOD OF PRODUCING A SOLID OXIDE FUEL CELL

[75] Inventors: Osamu Chikagawa; Hiroshi Takagi; Michiaki Iha, all of Nagaokakyo, Japan

[73] Assignee: Murata Manufacturing Co., Ltd., Japan

[21] Appl. No.: 396,697

[22] Filed: Mar. 1, 1995

[30] Foreign Application Priority Data

| Mar. 3, 1994 | [JP] | Japan | 6-033612 |
| Aug. 29, 1994 | [JP] | Japan | 6-203772 |
| Dec. 15, 1994 | [JP] | Japan | 6-312245 |

[51] Int. Cl.$^6$ .................................................. H01M 2/08
[52] U.S. Cl. ........................ 429/35; 429/34; 429/36; 29/623.2
[58] Field of Search ................. 429/34, 35, 36, 429/30; 29/623.2, 623.4; 156/89; 264/61

[56] References Cited

U.S. PATENT DOCUMENTS

| 3,501,833 | 3/1970 | Spiegler | 156/89 |
| 4,857,420 | 8/1989 | Maricle et al. | 429/30 |
| 4,950,562 | 8/1990 | Yoshida et al. | 429/34 |
| 5,256,499 | 10/1993 | Minh et al. | 29/623.4 |
| 5,273,837 | 12/1993 | Aitken et al. | 429/34 |

FOREIGN PATENT DOCUMENTS

| 0426265 | 5/1991 | European Pat. Off. . |
| 0620608 | 10/1994 | European Pat. Off. . |
| 133677 | 6/1987 | Japan . |
| 3285268 | 12/1991 | Japan . |
| 5082145 | 4/1993 | Japan . |

OTHER PUBLICATIONS

Webster's II New Riverside Dictionary, Houghton–Mifflin Company, pp. 900 and 1074 (month unknown), date 1988.
Chemical Abstracts, vol. 116, No. 18, 4 May 1992 –Yoshida Toshikiko "High Temperature Fuel Cells And Their Manufacture".

Patent Abstracts of Japan –vol. 17 No. 593 and Abstract JP–A–05 182678 –Jul. 1993.

Patent Abstracts of Japan –vol. 18 No. 599 and Abstract JP–A–06 231784 –Aug. 1994.

Patent Abstracts of Japan –vol. 14 No. 560 and Abstract JP–A–02 242564 –Sep. 1990.

Patent Abstracts of Japan –vol. 17 No. 411 and Abstract JP–A–05 082145 –Apr. 1993.

Patent Abstracts of Japan –vol. 14 No. 229 and Abstract JP–A–02 060063 –Feb. 1990.

Patent Abstracts of Japan –vol. 11 No. 359 and Abstract JP–A–62 133677 –Jun. 1987.

*Primary Examiner*—Prince Willis, Jr.
*Assistant Examiner*—Carol Chaney
*Attorney, Agent, or Firm*—Ostrolenk, Faber, Gerb & Soffen, LLP

[57] ABSTRACT

A method of producing a solid oxide fuel cell which has a generating section composed of a fuel electrode, a solid electrolyte and an air electrode, and interconnectors. A glass-containing joining agent is put among an edge of the generating section and edges of the interconnectors. Then, the glass-containing joining agent is heated and fused, and the edges of the interconnectors are connected to the edge of the generating section when the glass-containing joining agent is cooled. The joining agent may be a green sheet made of a glass-containing material or made of a mixture of glass and ceramics, or a thin plate made of a glass-containing material.

15 Claims, 3 Drawing Sheets

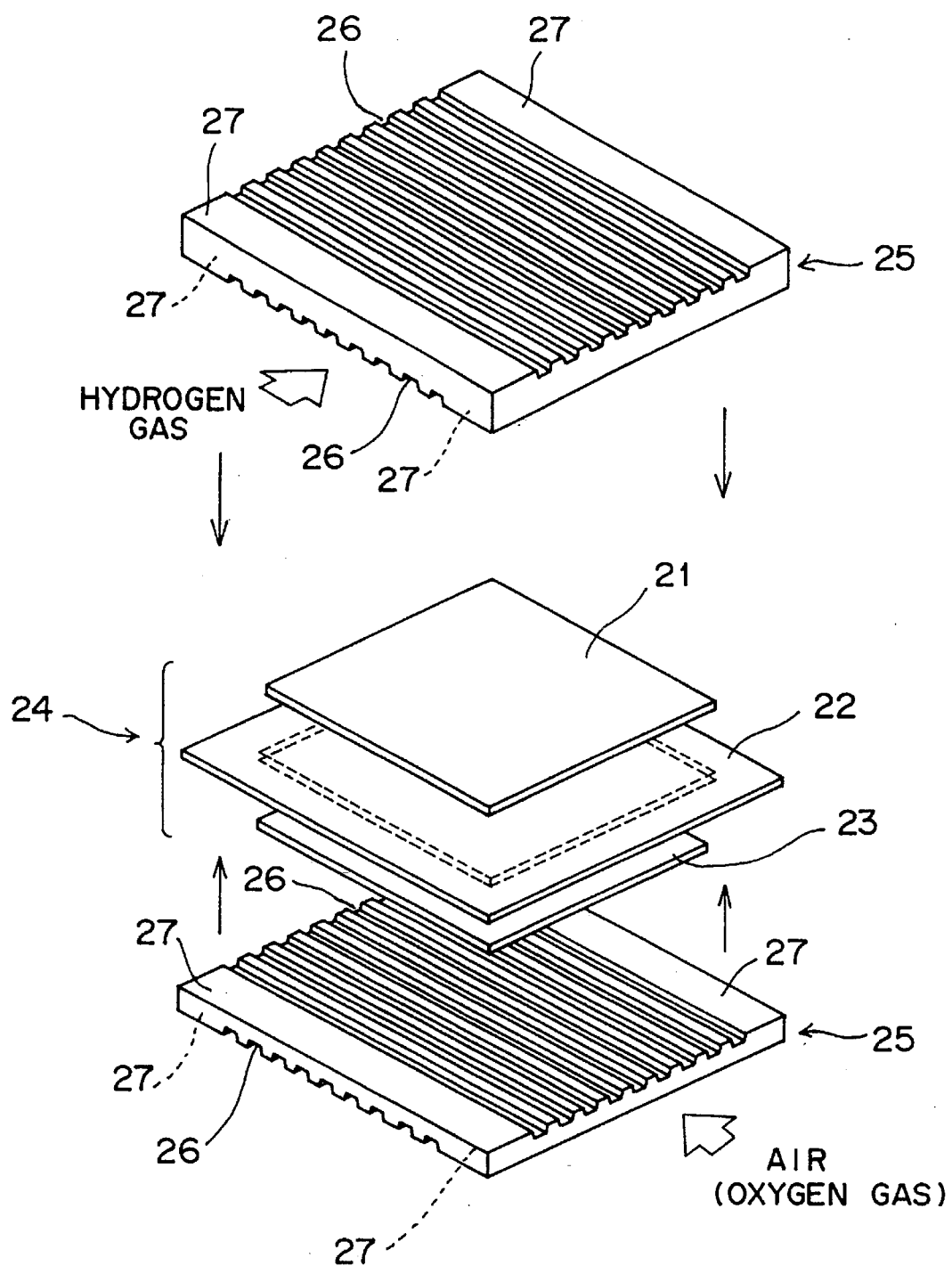

METHOD OF PRODUCING A SOLID OXIDE FUEL CELL

BACKGROUND OF THE INVENTION

1. Field of the Invention

The present invention relates to a method of producing a solid oxide fuel cell.

2. Description of Related Art

FIG. 3 shows the general structure of a planar solid oxide fuel cell. A fuel electrode 21, a solid electrolyte 22 and an air electrode 23 are laminated to form a generating section 24, which is the minimum unit of a fuel cell. In the generating section 24, hydrogen and air (oxygen) which are supplied from outside react to each other on the electrodes, and thereby, electrical energy is generated.

Generally, in order to obtain a high voltage, a plurality of generating sections 24 are electrically connected in series, and actually, are piled with interconnectors 25 thereamong. The interconnectors 25 prevent hydrogen supplied to the fuel electrodes 21 and air (oxygen) supplied to the air electrodes 23 from mixing together and also function as electronic conductors to electrically connect the generating sections 24 in series. A generating section 24 and two interconnectors 25 which sandwich the generating section 24 are called a cell.

Each interconnector 25 has grooves 26 on both sides, and the grooves 26 on one side and those on the other side extend in mutually perpendicular directions. The grooves 26 which face the fuel electrode 21 are a passage for hydrogen, and the grooves 26 which face the air electrode 23 are a passage for air (oxygen). The fuel electrode 21 and the air electrode 23 are smaller than the solid electrolyte 22. In FIG. 3, the fuel electrode 21 and the air electrode 23 are laid over the portions of the solid electrolyte 22 enclosed with the dashed lines. The portions of the solid electrolyte 22 outside the dashed lines have a width equal to the width of ungrooved edges of the interconnectors 25. Accordingly, the ungrooved edges of the interconnectors 25 are to be connected and the solid electrolyte 22, and the grooved portions on both sides thereof are to be connected to the fuel electrode 21 and the air electrode 23 respectively. For the connections between the grooved portions of the interconnectors 25 and the fuel electrode 21 and the &it electrode 23, a conductive material is used as the joining agent. On the other hand, for the connections between the ungrooved edges of the interconnectors 25 and the solid electrolyte 22, a material with a gas sealing function is used as the joining agent in order to seal the inside of the solid oxide fuel cell and to prevent hydrogen and air (oxygen) from mixing together.

The connections between the ungrooved edges of the interconnectors 25 and the solid electrolyte 22 have been conventionally carried out as follows. The gas sealing portions (ungrooved edges) 27 of the interconnectors 25 are coated with a glass-containing material in a slurry state and are put into contact with the generating section 24. Then, while a weight is being applied to the interconnectors 25 and the generating section 24, the glass-containing material is heated and fused. Thereafter, when the glass-containing material is cooled and hardened, the gas sealing portions 27 are connected to the solid electrolyte 22 of the generating section 24.

In the method, since a glass-containing material in a slurry state is used, it is difficult to form glass layers with an even thickness, and voids are likely to occur on the interfaces. In other words, there is a high possibility that the fuel cell does not have a sufficient airtightness. Thus, this method has a disadvantage that many defective products are made in this step of joining interconnectors and generating sections. During operation of the fuel cell at a temperature of about 1000° C., the glass-containing material melts into liquid and therefore functions as a sealant effectively. However, as the fuel cell is operated longer, the glass-containing material is flowing out and losing the function as a sealant.

In the light of the problem, Japanese Patent Laid Open Publication No. 3-67466 disclosed that a material in a slurry state which is a mixture of a liquid glass-containing material and a ceramic filler is used.

In this method, when a weight is applied to the interconnectors 25 and the generating section 24, the slurry may come out of the connecting portions. Thereby, the connecting portions may have an uneven thickness, and the generating section 24 and the interconnectors 25 may be contaminated. Also, there is a possibility that a fire-resisting article which is used as the weight can adhere to the generating section 24 because of the slurry which comes out of the connecting portions. In this case, in separating the weight from the generating section 24, the generating section 24 may be damaged by the glass contained in the slurry.

For even coating of a material in a slurry state, screen printing is conventionally adopted. However, screen printing is available only for flat surfaces and requires a screen formed pattern in conformity with the configuration of the surface. As far as joining of the interconnectors 25 to the generating section 24 is concerned, considering that two different materials must be coated on neighboring portions (the gas sealing portions 27 of the interconnectors 25 must be coated with a glass-containing material, while the grooved portions must be coated with a conductive material), coating by screen printing is very difficult.

SUMMARY OF THE INVENTION

An object of the present invention is to provide a method of producing a solid oxide fuel cell, in which the following problems which may occur in joining interconnectors to a generating section which is composed of a fuel electrode, a solid electrolyte and an air electrode can be prevented:

glass layers formed as the connecting layers among edges of the interconnectors and edges of the generating section have an uneven thickness;

a joining agent comes out of the connecting portions, thereby making the thickness of the connecting portions uneven, contaminating the generating section and/or the interconnectors, and/or making a fire-resisting article which is used as a weight stick to the generating section; and voids occur on the interfaces, thereby degrading the airtightness of the fuel cell.

In order to attain the object, a method of producing a solid oxide fuel cell comprises the steps of: putting a green sheet made of a glass-containing material or of a mixture of glass and ceramics or a thin plate made of a glass-containing material between an edge of an interconnector and an edge of a generating section which is formed by a fuel electrode, a solid electrolyte and an air electrode; and connecting the edge of the interconnector to the edge of the generating section by heating and fusing the green sheet or the thin plate and thereafter cooling the green sheet or the thin plate.

Since the joining agent is a green sheet made of a glass-containing material or of a mixture of glass and ceramic, or a thin glass plate not containing a binder and other organic substances, the joining agent does not come out of the connecting portions when a weight is applied. Therefore, a connecting layer with an even thickness, a high airtightness and no voids can be formed without contaminating the generating section and the interconnectors.

BRIEF DESCRIPTION OF THE DRAWINGS

This and other objects and features of the present invention will be apparent from the following description with reference to the accompanying drawings, in which:

FIG. 3 is an exploded perspective view of a cell of a conventional solid oxide fuel cell.

DETAILED DESCRIPTION OF THE PREFERRED EMBODIMENTS

Preferred embodiments of the present invention are described with reference to the accompanying drawings.

Figure 1:
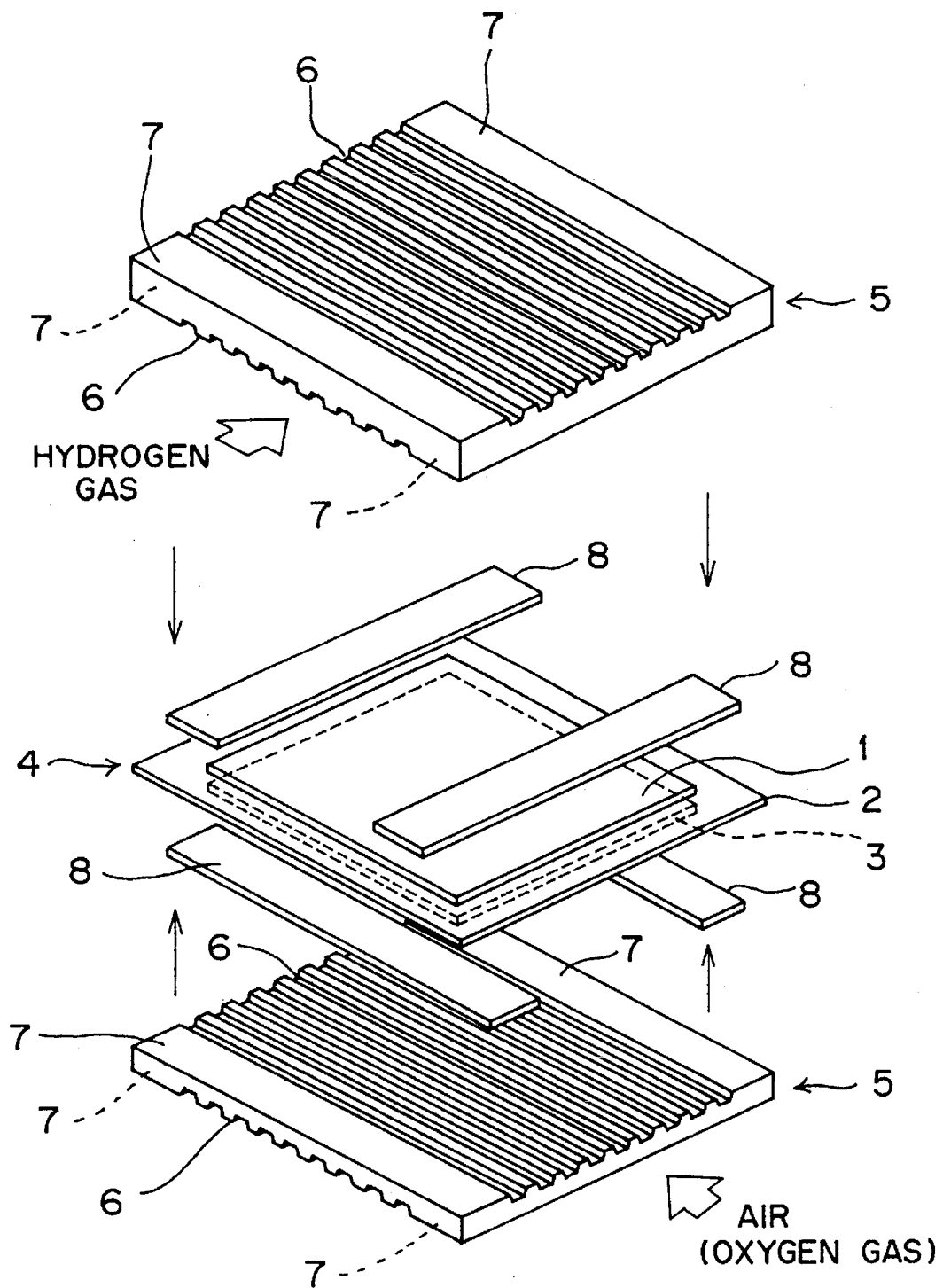
FIG. 1 is an exploded perspective view of a cell of a solid oxide fuel cell according to the present invention.
Figure 2:
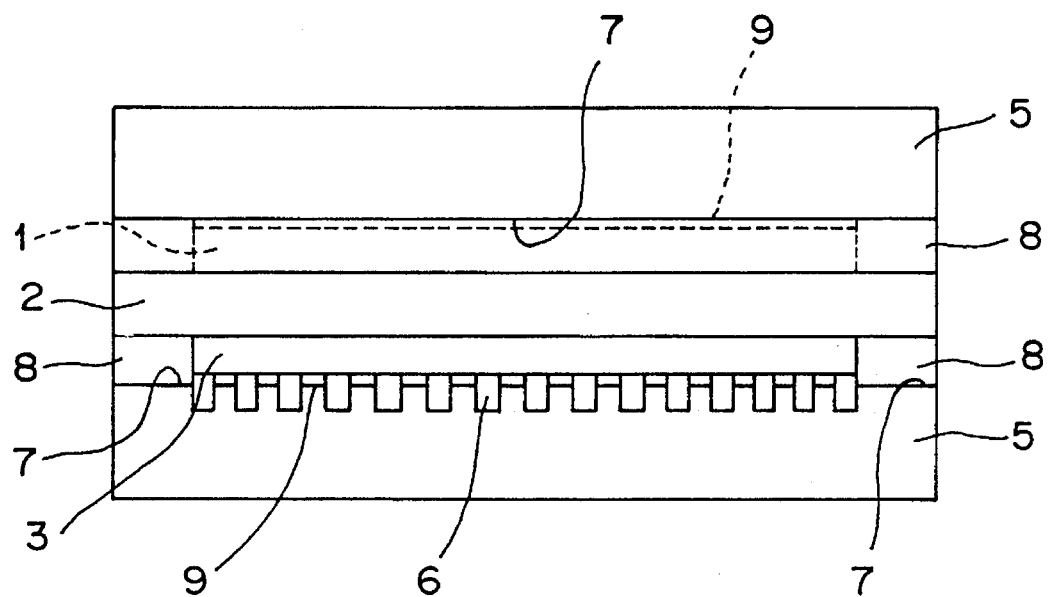
FIG. 2 is a side view of the cell of the solid oxide fuel cell of FIG. 1.

FIG. 1 is an exploded perspective view of a cell of a solid oxide fuel cell which can be produced by methods according to the present invention. FIG. 2 is a side view of the cell viewed from a side where air is supplied thereto.

First Embodiment

A planar solid oxide fuel cell has a general structure as shown in FIGS. 1 and 2. A fuel electrode 1, a solid electrolyte 2 and an air electrode 3 are laminated to form a generating section 4, which is the minimum unit of the solid oxide fuel cell. In the generating section 4, hydrogen and air (oxygen) supplied from outside react to each other on the electrodes, and thereby, electric energy is generated.

In order to obtain a high voltage, a plurality of generating sections 4 are electrically connected in series, and actually, are piled with interconnectors 5 thereamong. The interconnectors 5 prevent hydrogen supplied to the fuel electrodes 1 and air (oxygen) supplied to the air electrode 3 from mixing together and also function as electronic conductors to electrically connect the generating sections 4 in series. A generating section 4 and two interconnectors 5 which sandwich the generating section 4 are called a cell.

Each interconnector 5 has a plurality of grooves 6 on both sides, and the grooves 6 on one side and those on the other side extend in mutually perpendicular directions. The grooves 6 which face the fuel electrode 1 are a passage for hydrogen, and the grooves 6 which face the air electrode 3 are a passage for air (oxygen). The fuel electrode 1 and the air electrode 3 are smaller than the solid electrolyte 2. The fuel electrode 1 and the air electrode 3 are laid over the portions of the solid electrolyte 2 enclosed with the dashed lines. The portions outside of the dashed lines have a width equal to the width of ungrooved edges of the interconnectors 5. Accordingly, the ungrooved edges of the interconnectors 5 are to be connected to the solid electrolyte 2, and the grooved portions on both sides thereof are to be connected to the fuel electrode 1 and the air electrode 3 respectively. For the connections between the grooved portions of the interconnectors 5 and the fuel electrode 1 and the air electrode 3, a conductive material 9 is used as the joining agent (see FIG. 2).

On the other hand, for the connections between the ungrooved edges of the interconnectors 5 and the solid electrolyte 2, a material with a gas sealing function is used as the joining agent in order to seal the inside of the solid oxide fuel cell and to prevent hydrogen and air (oxygen) from mixing together. Therefore, green sheet strips 8 of a glass-containing material are provided on the gas sealing portions (ungrooved edges) 7 of the interconnectors 5. Then, the green sheet strips 8 are put into contact with the solid electrolyte 2, and the strips 8 are heated and fused. Thereafter, when they are cooled and hardened, the gas sealing portions 7 of the interconnectors 5 are connected to the solid electrolyte 2.

Now, the green sheet strips 8 of a glass-containing material are described in detail.

A proper volume of binder (polyvinyl butyral binder) and a proper volume of solvent (ethanol or toluene) are added to a powdery glass-containing material, and thereby, the glass-containing material is changed into slurry. The glass-containing material in a slurry state is made into a green sheet with a specified thickness by the doctor blade method. In this embodiment, the glass-containing material is actually a material whose main constituent is silica. Any material which has the following characteristics can be used as the glass-coating material: not reacting to any part of the generating section 4, that is, any of the fuel electrode 1, the solid electrolyte 2 and the air electrode 3; having a coefficient of thermal expansion which is substantially equal to those of the generating section 4 and the interconnectors 5; and functioning as a joining agent while being under temperatures from its softening point to the working temperature.

Next, the green sheet is cut into strips 8 of a shape corresponding to the connecting portions, that is, the edges of the generating sections 4 and the ungrooved edges of the interconnectors 5. An adhesive not containing a solvent is coated on both sides of the strips, and thereafter, the strips 8 are put among the generating section 4 and the interconnectors 5. Then, the generating section 4 and the interconnectors 5, while being loaded with a proper weight, actually being pushed by a fire-resisting article, are burned at a temperature of 1200° C. In this way, a cell is obtained.

A section of the cell was examined with a scanning type electron microscope (SEM). It was not seen that glass came out of the joints, and it was detected that the glass on the joints has an even thickness. Also, there were no traces of the fire-resisting article on the cell, and it can be inferred that sticking of the fire-resisting article to the cell did not occur.

In this method, even if the connecting surfaces are of a complicate shape, they can be connected successfully. Therefore, limitation on the design can be eased. Since the joining agent is not in a slurry state, it is not likely that glass will flow out of the agent as the cell is operated for long periods and accordingly, there is no fear that the joining agent will lose the gas sealing function. Further, the joining step in this method is simpler than that of a conventional method.

Second Embodiment

A second embodiment is a method using a glass plate to connect the gas sealing portions of the interconnectors and the generating section. The second embodiment is described with reference to FIGS. 1 and 2.

A proper volume of binder (polyvinyl butyral binder) and a proper volume of solvent (ethanol or toluene) are added to a powdery glass-containing material, and thereby, the glass-containing material is changed into slurry. The glass-containing material is a material which does not react any part of the generating section 4, that is, any of the fuel electrode 1, the solid electrolyte 2 and the air electrode 3, for example, a material whose main constituent is silica. Also, the glass-containing material has a working temperature higher than the operating temperature of the solid oxide fuel cell.

The glass-containing material in a slurry state is made into a green sheet by a doctor blade method, and the green sheet is cut into strips. The cutting step is carried out on consideration of the shrinkage factor of the green sheet such that the strips will have a thickness equal to the addition of the thickness of the fuel or air electrodes 1 or 3 and the thickness of the conductive joining agent 9 (see FIG. 2) and have a shape corresponding to the gas sealing portions 7 of the interconnectors 5 (see FIG. 1) after a heating process. While being nipped by the fire-resisting article which has a flat surface and does not react to glass, the green sheet strips are subjected to a high-temperature heating process (including degreasing) to vaporize the binder and other organic substances. In this way, thin glass strips 8 which contain no organic substances are obtained. The temperature of the heating process depends on the characteristics of the glass contained in the material. The heating process is carried out at a temperature where the glass does not melt, does not fuse and does not stick to the fire-resisting article. The thin glass strips 8 can be obtained not only in the above procedure but also in the following procedure: the green sheet is shaped to have a thickness which will be equal to the addition of the thickness of the fuel or air electrodes 1 or 3 and that of the conductive joining agent 9 after a heating process. Then, the shaped green sheet is subjected to a heating process to be turned into a glass-containing plate, and the glass-containing plate is cut into strips 8 of a shape corresponding to the gas sealing portions 7.

Sections of the glass strips 8 were examined with an SEM, and it was detected that they were fine glass with no voids.

The glass strips 8 are coated with an adhesive on both sides. Then, the glass strips 8 are placed among the interconnectors 5 and the generating section 4 such that the coated sides thereof come into contact with the gas sealing portions 7 of the interconnectors 5 and the edges of the solid electrolyte 2 of the generating section 4. Thereafter, while being loaded with a proper weight, these members are burned at a temperature of 1100° C., and a cell is obtained. After the burning, a section of the cell was examined with an SEM, and glass layers with an even thickness and no voids were detected. It was not seen that glass came out of the joints and contaminated the generating section 4 and the interconnectors 5.

Various kinds of glass can be processed in this method. Therefore, a proper kind of glass can be selected considering the coefficient of thermal expansion of the articles to be joined and the temperature of the joining process, and the kind of glass can be processed into a plate easily and at low cost.

According to the method, a glass plate is made by heating a green sheet containing glass powder, and therefore, the glass plate can be made to have any thickness easily.

Third Embodiment

A third embodiment is a method using a green sheet of a mixture of glass and ceramics to connect the gas sealing portions of the interconnectors and the generating section. The third embodiment is described with reference to FIGS. 1 and 2.

A proper volume of powdery glass-containing material, such as silica-containing material, and a proper volume of ceramic material which has a coefficient of thermal expansion substantially equal to those of the parts 1, 2 and 3 of the generating section 4 are mixed. Then, a proper volume of binder (polyvinyl butyral binder) and a proper volume of solvent (ethanol or toluene) are added to the mixture of glass and ceramics, and thereby, the mixture is changed into slurry. The mixture in a slurry state is made into a green sheet by the doctor blade method.

The green sheet is cut into strips 8 of a shape corresponding to the connecting portions, that is, the gas sealing portions 7 of the interconnectors 5 and the edges of the solid electrolyte 2 of the generating section 4. The glass-ceramic strips 8 are coated with an adhesive not containing a solvent on both sides, and the strips 8 are put among the interconnectors 5 and the generating section 4 such that the coated sides thereof come into contact with the gas sealing portions 7 of the interconnectors 5 and the solid electrolyte 2. Thereafter, while being loaded with a proper weight, these members are burned at a temperature of 1000° C. After the burning, sections of the joints were examined. It was detected that a glass-ceramic layer with an even thickness was formed in each of the joints, and it was not seen that glass came out of the joints and contaminated the generating section 4 and the interconnectors 5.

In the method, since a glass-ceramic green sheet is used as the joining agent, when a weight is applied, the joining agent does not come out of the connecting portions. By using a green sheet as the joining agent, the joining agent can be placed accurately on any surface, even a surface of a complicate shape, and can form a joining layer with an even thickness. Also, ceramics contained in the green sheet forms a porous frame and roughly fills the space between the connecting surfaces, while glass contained in the green sheet fills minute pores. Thus, the mixture of glass and ceramics functions as a sealant effectively. Further, the ceramic porous frame acts as a holder of melted glass, thereby preventing the glass from flowing out. Therefore, the glass-ceramic sealant is effective for a long time.

Although the present invention has been described in connection with the preferred embodiments above, it is to be noted that various changes and modifications are possible to those who are skilled in the art. Such changes and modifications are to be understood as being within the scope of the present invention.

What is claimed is:

1. A method of producing a solid oxide fuel cell, the method comprising the steps, in sequence, of:

making a green sheet which contains glass powder and a binder;

converting the green sheet into a glass-containing plate through heating to remove binder;

positioning the glass-containing plate between an edge of an interconnector and an edge of a generating section which is formed by a fuel electrode, a solid electrolyte and an air electrode; and forming a connection between the edge of the interconnector to the edge of the generating section through heating, fusing and cooling of the glass-containing plate.

2. A method as claimed in claim 1, wherein the heating of the green sheet is carried out at a temperature below the softening point of the glass powder.

3. A method as claimed in claim 1, wherein the heating and fusing of the glass-containing plate is carried out in a temperature between the softening point of the glass and the working temperature of the glass.

4. A method as claimed in claim 3, wherein the heating of the green sheet is carried out at a temperature below the softening point of the glass powder.

5. A method as claimed in claim 1, wherein the main constituent of the glass powder is silicon.

6. A method as claimed in claim 5, wherein the heating of the green sheet is carried out at a temperature below the softening point of the glass powder.

7. A method as claimed in claim 5, wherein the heating and fusing of the glass-containing plate is carried out in the temperature range between the softening point of the glass and the working temperature of the glass.

8. A method as claimed in claim 7, wherein the heating process of the green sheet is carried out at a temperature below the softening point of the glass powder.

9. A method as claimed in claim 1, wherein the glass powder additionally contains ceramic.

10. A method as claimed in claim 9, wherein the heating of the green sheet is carried out at a temperature below the softening point of the glass powder.

11. A method as claimed in claim 1, wherein the heating and fusing of the glass-containing plate is carried out in the temperature range between the softening point of the glass and the working, temperature of the glass.

12. A method as claimed in claim 11, wherein the heating of the green sheet is carried out at a temperature below the softening point of the glass powder.

13. A method as claimed in claim 12, wherein the heating and fusing of the glass-containing plate is carried out in the temperature range between the softening point of the glass and the working temperature of the glass.

14. A method as claimed in claim 13, wherein the solid electrolyte extends outwardly beyond the fuel and air electrodes and the glass-containing plate is positioned on the portion of the solid electrolyte extending beyond said electrodes.

15. A method as claimed in claim 1, wherein the solid electrolyte extends outwardly beyond the fuel and air electrodes and the glass-containing plate is positioned on the portion of the solid electrolyte extending beyond said electrodes.

* * * * *